(12) United States Patent
Nemat-Nasser et al.

(10) Patent No.: US 8,989,914 B1
(45) Date of Patent: Mar. 24, 2015

(54) DRIVER IDENTIFICATION BASED ON DRIVING MANEUVER SIGNATURE

(75) Inventors: Syrus C. Nemat-Nasser, San Diego, CA (US); Andrew Tombras Smith, San Diego, CA (US); Erwin R. Boer, La Jolla, CA (US)

(73) Assignee: Lytx, Inc., San Diego, CA (US)

( * ) Notice: Subject to any disclaimer, the term of this patent is extended or adjusted under 35 U.S.C. 154(b) by 96 days.

(21) Appl. No.: 13/329,386

(22) Filed: Dec. 19, 2011

(51) Int. Cl.
*G06F 7/00* (2006.01)
*G06F 17/00* (2006.01)
*G08G 1/123* (2006.01)
*G06Q 10/00* (2012.01)

(52) U.S. Cl.
USPC ............... 701/1; 701/409; 701/439; 340/988; 705/7.42

(58) Field of Classification Search
USPC .............. 701/1, 409, 439; 702/127; 705/7.42; 340/988
See application file for complete search history.

(56) References Cited

U.S. PATENT DOCUMENTS

| | | | |
|---|---|---|---|
| 4,281,354 A | 7/1981 | Conte | |
| 4,718,685 A | 1/1988 | Kawabe et al. | |
| 5,140,436 A | 8/1992 | Blessinger | |
| 5,497,419 A | 3/1996 | Hill | |
| 5,546,191 A | 8/1996 | Hibi et al. | |
| 5,600,775 A | 2/1997 | King et al. | |
| 5,689,442 A | 11/1997 | Swanson et al. | |
| 5,815,093 A | 9/1998 | Kikinis | |
| 5,825,284 A | 10/1998 | Dunwoody et al. | |
| 6,141,611 A | 10/2000 | Makey et al. | |
| 6,163,338 A | 12/2000 | Johnson et al. | |
| 6,389,340 B1 | 5/2002 | Rayner | |
| 6,405,132 B1 | 6/2002 | Breed et al. | |
| 6,449,540 B1 | 9/2002 | Rayner | |
| 6,575,902 B1 | 6/2003 | Burton | |
| 6,718,239 B2 | 4/2004 | Rayner | |
| 7,209,833 B2 | 4/2007 | Isaji et al. | |
| 7,702,442 B2 | 4/2010 | Takenaka | |
| 7,821,421 B2 | 10/2010 | Tamir et al. | |
| 2001/0005804 A1 | 6/2001 | Rayner | |
| 2002/0111725 A1 | 8/2002 | Burge | |
| 2002/0163532 A1 | 11/2002 | Thomas et al. | |
| 2003/0080878 A1 | 5/2003 | Kirmuss | |
| 2004/0039503 A1 | 2/2004 | Doyle | |
| 2004/0103010 A1 | 5/2004 | Wahlbin et al. | |
| 2004/0236474 A1* | 11/2004 | Chowdhary et al. ............... 701/1 |

(Continued)

FOREIGN PATENT DOCUMENTS

| | | |
|---|---|---|
| DE | 4416991 | 11/1995 |
| EP | 1818873 | 8/2007 |

OTHER PUBLICATIONS

World News Tonight, CBS Television New Program discussing teen drivers using the DriveCam Program and DriveCam Technology, Oct. 10, 2005, on PC formatted CD-R, World News Tonight.wmv, 7.02 MB, Created Jan. 12, 2011.

(Continued)

*Primary Examiner* — Fadey Jabr
*Assistant Examiner* — Thomas Ingram
(74) *Attorney, Agent, or Firm* — Van Pelt, Yi & James LLP

(57) ABSTRACT

A system for driver identification comprises a processor and a memory. The processor is configured to receive a driving maneuver signature and to determine a driver identification based at least in part on the driving maneuver signature. The memory is coupled to the processor and is configured to provide the processor with instructions.

27 Claims, 10 Drawing Sheets

(56) References Cited

U.S. PATENT DOCUMENTS

| | | | |
|---|---|---|---|
| 2005/0073585 A1 | 4/2005 | Ettinger et al. | |
| 2005/0166258 A1 | 7/2005 | Vasilevsky et al. | |
| 2006/0053038 A1 | 3/2006 | Warren et al. | |
| 2006/0103127 A1 | 5/2006 | Lie et al. | |
| 2006/0212195 A1 | 9/2006 | Veith et al. | |
| 2006/0253307 A1 | 11/2006 | Warren et al. | |
| 2007/0001831 A1* | 1/2007 | Raz et al. | 340/439 |
| 2007/0027726 A1* | 2/2007 | Warren et al. | 705/4 |
| 2007/0124332 A1 | 5/2007 | Ballesty et al. | |
| 2007/0135979 A1 | 6/2007 | Plante | |
| 2007/0136078 A1 | 6/2007 | Plante | |
| 2007/0150140 A1 | 6/2007 | Seymour | |
| 2007/0173994 A1 | 7/2007 | Kubo et al. | |
| 2007/0216521 A1* | 9/2007 | Guensler et al. | 340/439 |
| 2007/0241874 A1 | 10/2007 | Okpysh et al. | |
| 2007/0257781 A1 | 11/2007 | Denson | |
| 2007/0257804 A1 | 11/2007 | Gunderson et al. | |
| 2007/0257815 A1* | 11/2007 | Gunderson et al. | 340/903 |
| 2007/0260677 A1 | 11/2007 | DeMarco et al. | |
| 2007/0268158 A1 | 11/2007 | Gunderson et al. | |
| 2007/0271105 A1 | 11/2007 | Gunderson et al. | |
| 2007/0299612 A1 | 12/2007 | Kimura et al. | |
| 2008/0167775 A1 | 7/2008 | Kuttenberger et al. | |
| 2008/0269978 A1 | 10/2008 | Shirole | |
| 2009/0224869 A1 | 9/2009 | Baker et al. | |
| 2010/0023223 A1* | 1/2010 | Huang et al. | 701/44 |
| 2010/0063672 A1 | 3/2010 | Anderson | |
| 2010/0070175 A1 | 3/2010 | Soulchin et al. | |
| 2010/0085193 A1 | 4/2010 | Boss et al. | |
| 2010/0209885 A1* | 8/2010 | Chin et al. | 434/65 |
| 2012/0283893 A1* | 11/2012 | Lee et al. | 701/1 |

OTHER PUBLICATIONS

"World News Tonight", PBS Television New Program discussing teen drivers using the DriveCam Program and DriveCam Technology, Oct. 10, 2005, on PC formatted CD-R, Teens Behind the Wheel. wmv, 236 MB, Created Jan. 12, 2011.
"Driver Feedback System", Jun. 12, 2001.
Jean (DriveCam vendor), "Feedback Data Sheet", Nov. 6, 2002.
"Interior Camera Data Sheet", Oct. 26, 2001.
Jean (DriveCam vendor), "HindSight 20-20 Data Sheet", Nov. 4, 2002.
"DriveCam Driving Feedback System", Mar. 15, 2004.
Chris Woodyard, "Shuttles save with DriveCam", Dec. 9, 2003.
Julie Stevens, "DriveCam Services", Nov. 15, 2004.
Julie Stevens, "Program Support Roll-Out & Monitoring", Jul. 13, 2004.
Jessyca Wallace, "The DriveCam Driver Feedback System", Apr. 6, 2004.
Karen, "Managers Guide to the DriveCam Driving Feedback System", Jul. 30, 2002.
Del Lisk, "DriveCam Training Handout Ver4", Feb. 3, 2005.
Jessyca Wallace, "Overview of the DriveCam Program", Dec. 15, 2005.
"DriveCam—Illuminator Data Sheet", Oct. 2, 2004.
Karen, "Downloading Options to HindSight 20/20", Aug. 6, 2002.
Bill, "DriveCam—FAQ", Dec. 12, 2003.
David Maher, "DriveCam Brochure Folder", Jun. 6, 2005.
"Passenger Transportation Mode Brochure", May 2, 2005.
Quinn Maughan, "DriveCam Unit Installation", Jul. 21, 2005.
Glenn Oster, "Illuminator Installation", Oct. 3, 2004.
Quinn Maughan, "HindSight Installation Guide", Sep. 29, 2005.
Quinn Maughan, "HindSight Users Guide", Jun. 20, 2005.
"Ambulance Companies Use Video Technology to Improve Driving Behavior", Ambulance Industry Journal, Spring 2003.
Lisa McKenna, "A Fly on the Windshield?", Pest Control Technology Magazine, Apr. 2003.
Quinn Maughan, "Enterprise Services", Apr. 17, 2006.
Quinn Maughan, "DriveCam Enterprise Services", Jan. 5, 2006.
Quinn Maughan, "DriveCam Managed Services", Jan. 5, 2006.
Quinn Maughan, "DriveCam Standard Edition", Jan. 5, 2006.
Kathy Latus (Latus Design), "Case Study—Time Warner Cable", Sep. 23, 2005.
Kathy Latus (Latus Design), "Case Study—Cloud 9 Shuttle", Sep. 23, 2005.
Kathy Latus (Latus Design), "Case Study—Lloyd Pest Control", Jul. 19, 2005.
Bill Siuru, "DriveCam Could Save You Big Bucks", Land Line Magazine, May-Jun. 2000.
J. Gallagher, "Lancer Recommends Tech Tool", Insurance and Technology Magazine, Feb. 2002.
Jessyca Wallace, "Analyzing and Processing DriveCam Recorded Events", Oct. 6, 2003.
PCT/US2010/022012, Invitation to Pay Additional Fees with Communication of Partial International Search, Jul. 21, 2010.
David Cullen, "Getting a real eyeful", Fleet Owner Magazine, Feb. 2002.
Ronnie Rittenberry, "Eyes on the Road", Jul. 2004.
"HindSight v4.0 Users Guide", DriveCam Video Systems, Apr. 25, 2005.
Glenn Oster, "HindSight 20/20 v4.0 Software Installation", 1 of 2, Jun. 20, 2003.
Glenn Oster, "HindSight 20/20 v4.0 Software Installation", 2 of 2, Jun. 20, 2003.
DriveCam Extrinsic Evidence with Patent LR 4.1.a Disclosures, Nov. 8, 2011.
"DriveCam, Inc's Disclosure of Proposed Constructions and Extrinsic Evidence Pursuant to Patent L.R. 4.1.a & 4.1.b" in *DriveCam, Inc. v. SmartDrive Systems, Inc.*, Case No. 3:11-CV-00997-H-RBB, for the Southern District of California. Nov. 8, 2011.
"Preliminary Claim Construction and Identification of Extrinsic Evidence of Defendant/Counterclaimant SmartDriveSystems, Inc." in *DriveCam, Inc. v. SmartDrive Systems, Inc.*, Case No. 3:11-CV-00997-H (RBB), for the Southern District of California. Nov. 8, 2011.
"DriveCam, Inc's Disclosure of Responsive Constructions and Extrinsic Evidence Pursuant to Patent L.R. 4.1.c & 4.1d" in *DriveCam, Inc. v. SmartDrive Systems, Inc.*, Case No. 3:11-CV-00997-H-RBB, for the Southern District of California. Nov. 15, 2011.
"Responsive Claim Construction and Identification of Extrinsic Evidence of Defendant/Counterclaimant SmartDrive System, Inc." in *DriveCam, Inc. v. SmartDrive Systems, Inc.*, Case No. 3:11-CV-00997-H (RBB), for the Southern District of California. Nov. 15, 2011.
"Joint Claim Construction Chart" in *DriveCam, Inc. v. SmartDrive Systems, Inc.*, Case No. 11-CV-0997-H (RBB), for the Southern District of California, Document 43, filed Dec. 1, 2011, pp. 1-2.
Joint Claim Construction Chart, U.S. Patent No. 6,389,340, "Vehicle Data Recorder" for Case No. 3:11-CV-00997-H-RBB, Document 43-1, filed Dec. 1, 2011, pp. 1-33.
"Joint Claim Construction Worksheet" in *DriveCam, Inc. v. SmartDrive Systems, Inc.*, Case No. 3:11-CV-00997 H (RBB), for the Southern District of California, Document 44, filed Dec. 1, 2011, pp. 1-2.
Joint Claim Construction Worksheet, U.S. Patent No. 6,389,340, "Vehicle Data Reporter" for Case No. 3:11-CV-00997-H-RBB, Document 44-1, filed Dec. 1, 2011, pp. 1-10.
"Answer to Amended Complaint; Counterclaims; and Demand for Jury Trial" in *DriveCam, Inc. v. SmartDrive Systems, Inc.*, Case No. 3:11-CV-00997 H (RBB), for the Southern District of California, Document 47, filed Dec. 13, 2011, pp. 1-15.
"First Amended to Amended Complaint and First Amended Counterclaims; and Demand for July Trial" in *DriveCam, Inc. v. SmartDrive Systems, Inc.*, Case No. 3:11-CV-00997 H (RBB), for the Southern District of California, Document 53, filed Dec. 20, 2011, pp. 1-48.
"First Amended Answer to Amended Complaint and First Amended Counterclaims; and Demand for Jury Trial" in *DriveCam, Inc. v. SmartDrive Systems, Inc.*, Case No. 3:11-CV-00997 H (RBB), for the Southern District of California, Document 55, filed Jan. 3, 2012, pp. 86-103.
DriveCam, User's Manual for DriveCam Video Systems', HindSight 20/20 Software Version 4.0, S002751-S002804(2003).

(56) References Cited

OTHER PUBLICATIONS

SmartDrives Systems, Inc.'s Production, S014246-S014255, Nov. 16, 2011.
"Supplement to DriveCam's Disclosure of Asserted Claims and Preliminary Infringement Contentions" in *DriveCam, Inc. v. SmartDrive Systems, Inc.*, Case No. 3:11-CV-00997-H-RBB, for the Southern District of California. Oct. 14, 2011.
"DriveCam's Disclosure of Asserted Claims and Preliminary Infringement Contentions" in *DriveCam, Inc. v. SmartDrive Systems, Inc.*, Case No. 3:11-CV-00997-H-RBB, for the Southern District of California. Aug. 19, 2011.
DriveCam, Inc.'s Infringement Contentions Exhibit A, U.S. Patent 6,389,340. Aug. 11, 2011.
DriveCam, Inc.'s Infringement Contentions Exhibit B, U.S. Patent 7,659,827. Aug. 19, 2011.
DriveCam, Inc.'s Infringement Contentions Exhibit C, U.S. Patent 7,804,426. Aug. 19, 2011.
U.S. Appl. No. 11/297,669, filed Dec. 8, 2005, File History.
"Amended Complaint for Patent Infringement, Trade Secret Misappropriation, Unfair Competition and Conversion" in *DriveCam, Inc. v. SmartDrive Systems, Inc.*, Case No. 3:11-CV-00997-H-RBB, for the Southern District of California, Document 34, filed Oct. 20, 2011, pp. 1-15.
U.S. Appl. No. 11/296,906, filed Dec. 8, 2005, File History.
U.S. Appl. No. 11/298,069, filed Dec. 9, 2005, File History.
U.S. Appl. No. 11/299,028, filed Dec. 9, 2005, File History.
U.S. Appl. No. 11/593,659, filed Nov. 7, 2006, File History.
U.S. Appl. No. 11/593,682, filed Nov. 7, 2006, File History.
U.S. Appl. No. 11/595,015, filed Nov. 9, 2006, File History.
U.S. Appl. No. 11/637,754, filed Dec. 13, 2006, File History.
U.S. Appl. No. 11/637,755, filed Dec. 13, 2006, File History.
DriveCam, Inc., User's Manual for DriveCam Video Systems' Hindsight 20/20 Software Version 4.0 (2003).
Gary and Sophia Rayner, Final Report for Innovations Deserving Exploratory Analysis (IDEA) Intelligent Transportation Systems (ITS) Programs' Project 84, I-Witness Black Box Recorder, San Diego, CA. Nov. 2001.
Panasonic Corporation, Video Cassette Recorder (VCR) Operating Instructions for Models No. PV-V4020/PV-V4520 (1998) (Exhibit 8) (hereinafter "Panasonic").
JVC Company of America, JVC Video Cassette Recorder HR-IP820U Instructions (1996).
Hans Fantel, Video; Search Methods Make a Difference in Picking VCR's, NY Times, Aug. 13, 1989.
Dan Carr, Flash Video template: Video Presentation with Navigation, Jan. 16, 2006.
I/O Port Racing Supplies' website discloses using Traqmate's Data Acquisition with Video Overlay system in conjunction with professional driver coaching sessions (available at http://www.ioportracing.com/Merchant2/merchant.mvc?Screen=CTGY&Category_Code=coaching)., printed from site on Jan. 11, 2012.
GE published its VCR User's Guide for Model VG4255 in 1995.
Adaptec published and sold its VideoOh! DVD software USB 2.0 Edition in at least Jan. 24, 2003.
Traqmate GPS Data Acquisition's Traqmate Data Acquisition with Video Overlay system was used to create a video of a driving event on Oct. 2, 2005 (available at http://www.trackvision.net/phpBB2/viewtopic.php?t=51&sid=1184fbbcbe3be5c87ffa0f2ee6e2da76), printed from site on Jan. 11, 2012.
David Vogeleer et al., Macromedia Flash Professional 8UNLEASHED (Sams Oct. 12, 2005) in Nov. 2005.
Jean (DriveCam vendor), "DriveCam brochure", Nov. 6, 2002.
"The DriveCam", Nov. 6, 2002.
Jean (DriveCam vendor), "DC Data Sheet", Nov. 6, 2002.

\* cited by examiner

DRIVER IDENTIFICATION BASED ON DRIVING MANEUVER SIGNATURE

BACKGROUND OF THE INVENTION

Accurate identification of a driver is needed to appropriately assess a driver's behavior and be able to detect changes in a driver's performance. One reliable and documented way to identify a driver is to use an image of the driver captured during the trip. However, it is not always possible to obtain a good driver image. Often times, even if repeated attempts are made to capture a driver's image, it is not possible to obtain a good quality image for accurate identification due to various factors—for example, poor lighting and/or obstruction of facial features by a beard and/or sunglasses. In some cases, a camera is not available to capture images of the driver, yet it is still important to indentify the driver.

BRIEF DESCRIPTION OF THE DRAWINGS

Various embodiments of the invention are disclosed in the following detailed description and the accompanying drawings.

DETAILED DESCRIPTION

Figure 1:
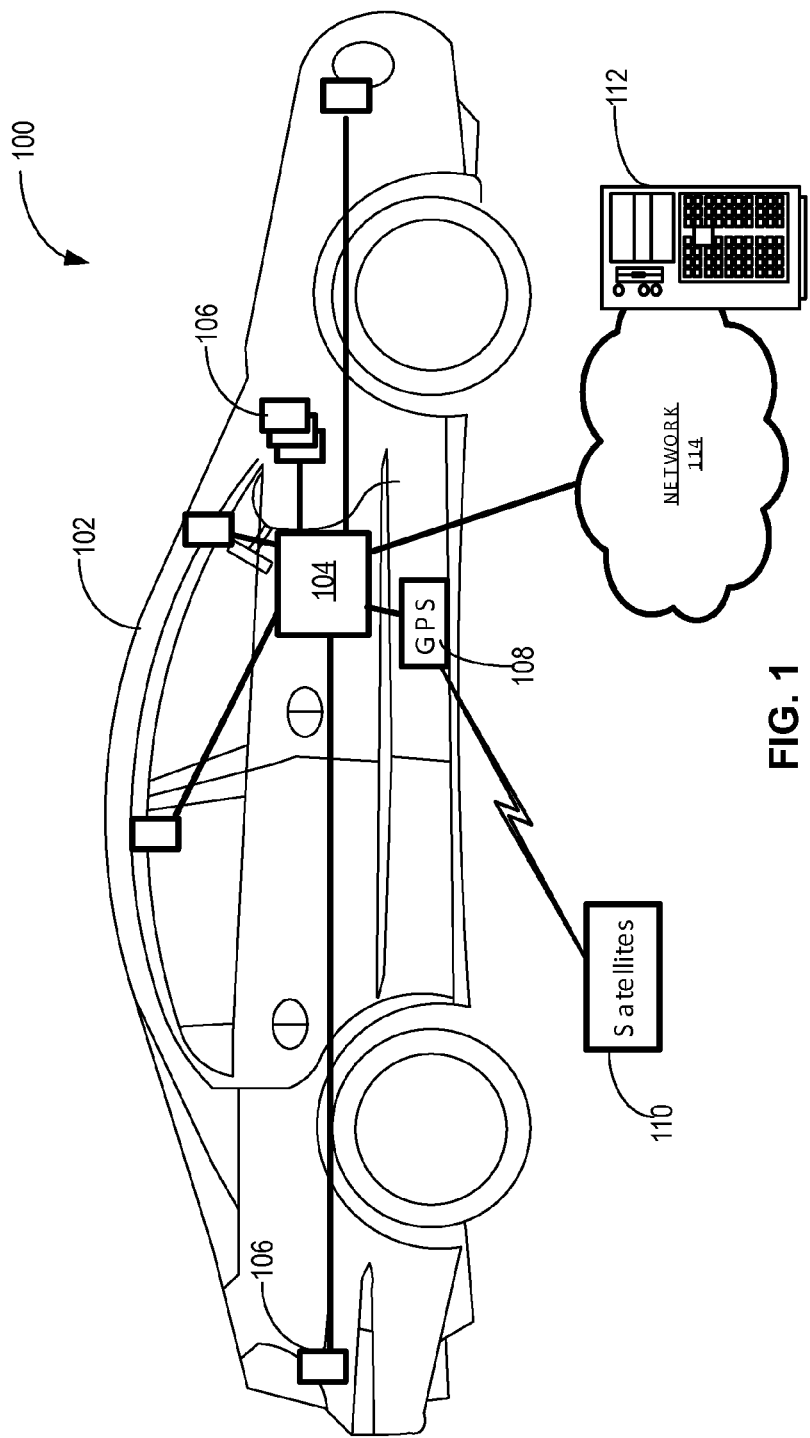
FIG. 1 is a block diagram illustrating an embodiment of a system for driver identification.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for driver identification is disclosed. The system comprises a processor and a memory. The processor is configured to receive a driving maneuver signature and to determine a driver identification based at least in part on the driving maneuver signature. The memory is coupled to the processor and is configured to provide the processor with instructions.

In some embodiments, the driver identification comprises matching the driving maneuver signature to one or more of a plurality of previously stored driving maneuver signatures. In some embodiments, the driver identification is determined to be a driver associated with the matching, previously stored driving maneuver signatures. In various embodiments, the driving maneuver is associated with a specific trip, with a specific location, or any other appropriate associated item. In some embodiments, the driving maneuver signature comprises a set of vehicle sensor data. In various embodiments, the driving maneuver comprises a right/left turn maneuver, a highway on/off ramp maneuver, a U-turn maneuver, a lane change maneuver, a vehicle launching from stop maneuver, a vehicle braking maneuver, a curve-handling maneuver, a car following maneuver, and/or any other appropriate driving maneuvers. In some embodiments, a plurality of driving maneuver signatures captured during continuous vehicle operation, and therefore assumed to have been performed by the same driver, is compared, as a group, to sets of previously stored driving maneuver signatures that are associated with known drivers, thereby increasing the accuracy of driver identification.

In some embodiments, a driver of a trip is identified based on the driver's driving maneuver signature. In some embodiments, the driving maneuver comprises a driving maneuver common to all trips. For example, the driving maneuver is a cornering maneuver that must be performed by all drivers as their vehicles exit the fleet yard at the beginning of a trip.

In some embodiments, driving maneuver data is automatically associated with a driver. In various embodiments, the driving maneuver data is associated with a vehicle, a shift, a trip, a time of day, a period during the year, or any other appropriate grouping. In some embodiments, a shift comprises a period of time of the day (e.g., 9 AM to 5 PM). In various embodiments, a trip comprises a driving period between ignition on and ignition off, a portion of a driving period performed by a single driver, a drive between a first location and a second location, or any other appropriate definition of a trip.

FIG. 1 is a block diagram illustrating an embodiment of a system for driver identification. In the example shown, vehicle 102 is equipped with onboard computer 104 that interfaces with onboard sensors 106. Onboard computer 104 includes one or more processors that are capable of executing computer instructions for carrying out various functions involved in assessing driver performance. Onboard computer 104 further includes one or more data storage units for storing computer instructions, rules, algorithms, driving data, various databases and maps such as a digital safety map. Onboard computer 104 further includes one or more communication interfaces for communicating with onboard sensors 106 (including GPS receiver 108) and remote server 112 sitting on network 114. The communication interfaces can include interfaces for wired and/or wireless (short range or long range) links, direct and/or indirect communication links. Example include interfaces for USB cable, vehicle bus (e.g., on board diagnostics (OBD)), global positioning system (GPS), Bluetooth™, ZigBee™ link, IEEE 802.11 point-to-point link, and wire/wireless data network link. Network 114 can include wired or wireless network such as wired or wireless phone network, local area network (LAN), and wide area network (WAN).

In various embodiments, onboard sensors 106 include at least an image capturing device (e.g., video camera and still camera), GPS receiver 108 for receiving geo-location data, and a sensor for detecting vehicle operation state. In some embodiments, GPS receiver 108 is configured to receive geo-location data from one or more satellites 110. In some embodiments, some of onboard sensors 106 (e.g., GPS receiver, accelerometer) are incorporated into the onboard computer. In some embodiments, onboard sensors 106 are separate from onboard computer 104. Onboard sensors 106 can be configured to detect various driving data during vehicle operation, including driver behavior, vehicle operation state, and/or various driving conditions or environmental parameters. The driving conditions may include road conditions, weather conditions, and/or traffic conditions. In various embodiments, circuitries, processors and/or communications interfaces can be included in one or more sensors for carrying out various functions such as capturing, storing, processing, and/or transmitting sensor data. For example, sensor on/off circuitry may be included to turn on/off the sensor, data capture circuitry may be included to capture sensor data, and communications interface circuitry may be included to transmit sensor data to a remote server. These sensor functions may be performed automatically by the sensor or carried out in response to external commands issued for example by the onboard computer 104. In various embodiments, one or more data storage units (not shown) are included in or associated with one or more sensors for storing computer instructions and sensor data. The data storage units may include internal or external, fixed or removable, networked, persistent and/or volatile memory. Onboard computer 104 is configured to receive sensor data from one or more onboard sensors and receive other information from other external source(s) (e.g., satellite GPS location data, weather information, and/or road map) via the various communications interfaces. For example, still or moving images from various viewing perspectives; speed, acceleration and direction of the vehicle; the geo-location of the vehicle, and environmental temperature and moisture level are received from various onboard sensors. The received sensor data are analyzed to determine driver identity by associating data with driving maneuvers. The data from different sensors may be correlated to time and geo-location of the moving vehicle.

In various embodiments, onboard computer 104 may be configured to perform analyses of the detected driving data. Since the computational capacity of the onboard computing device may be limited, such analyses may be preliminary analyses and less robust or complex or precise than those that can be performed on a remote server that has more computing power. In various embodiments, onboard computer 104 may be configured to upload the driving data (e.g., sensor data and/or analysis data) to remote server 112 for further analysis, processing, and/or storage. Uploading can be carried out automatically by onboard computer 104 based on predefined criteria or upon requests by, for example, remote server 112. Remote server 112 may perform more detailed and/or additional analysis of the driving data. For example, the server may use the driving data to determine a driver identity from driving maneuver data, analyze driving data, determine driver performance such as driver attitude (e.g., recklessness) and skill, calculate driver risk score, generate driver profiles, identify dangerous and erratic driving behavior, identify driver deviation from his/her normal driving behavior (by comparing with his/her driver profile), identify high risk drivers, perform risk analysis for a group of drivers or for an entire fleet, calculate insurance, and/or generate various reports.

Figure 2:
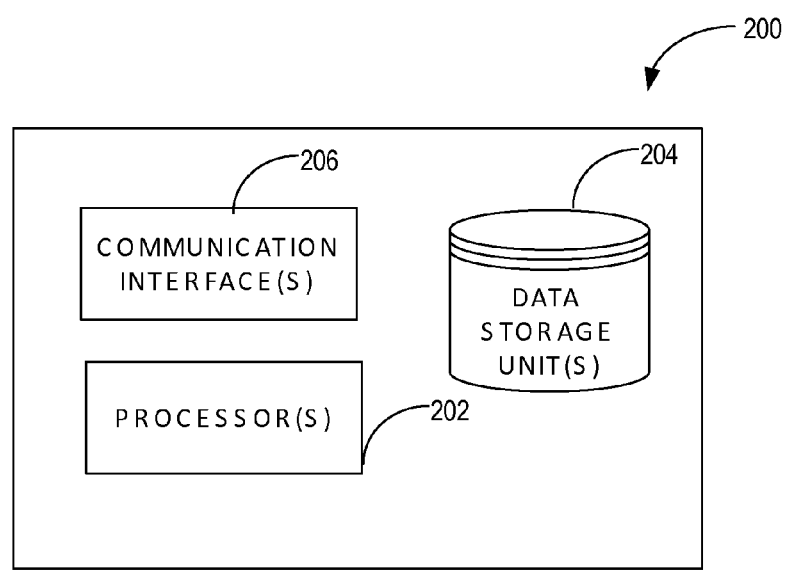
FIG. 2 is a block diagram illustrating an embodiment of an onboard computer.

FIG. 2 is a block diagram illustrating an embodiment of an onboard computer. In some embodiments, onboard computer 200 of FIG. 2 comprises onboard computer 104 of FIG. 1. In the example shown, onboard computer 200 includes one or more processors that are capable of executing computer instructions for carrying out various functions involved in assessing driver performance. Onboard computer 200 further includes one or more data storage units 204 for storing computer instructions, rules, algorithms, driving data, various databases and maps such as a digital safety map. Onboard computer 200 further includes one or more communication interfaces 206 for communicating with onboard sensors and a network.

Figure 3:
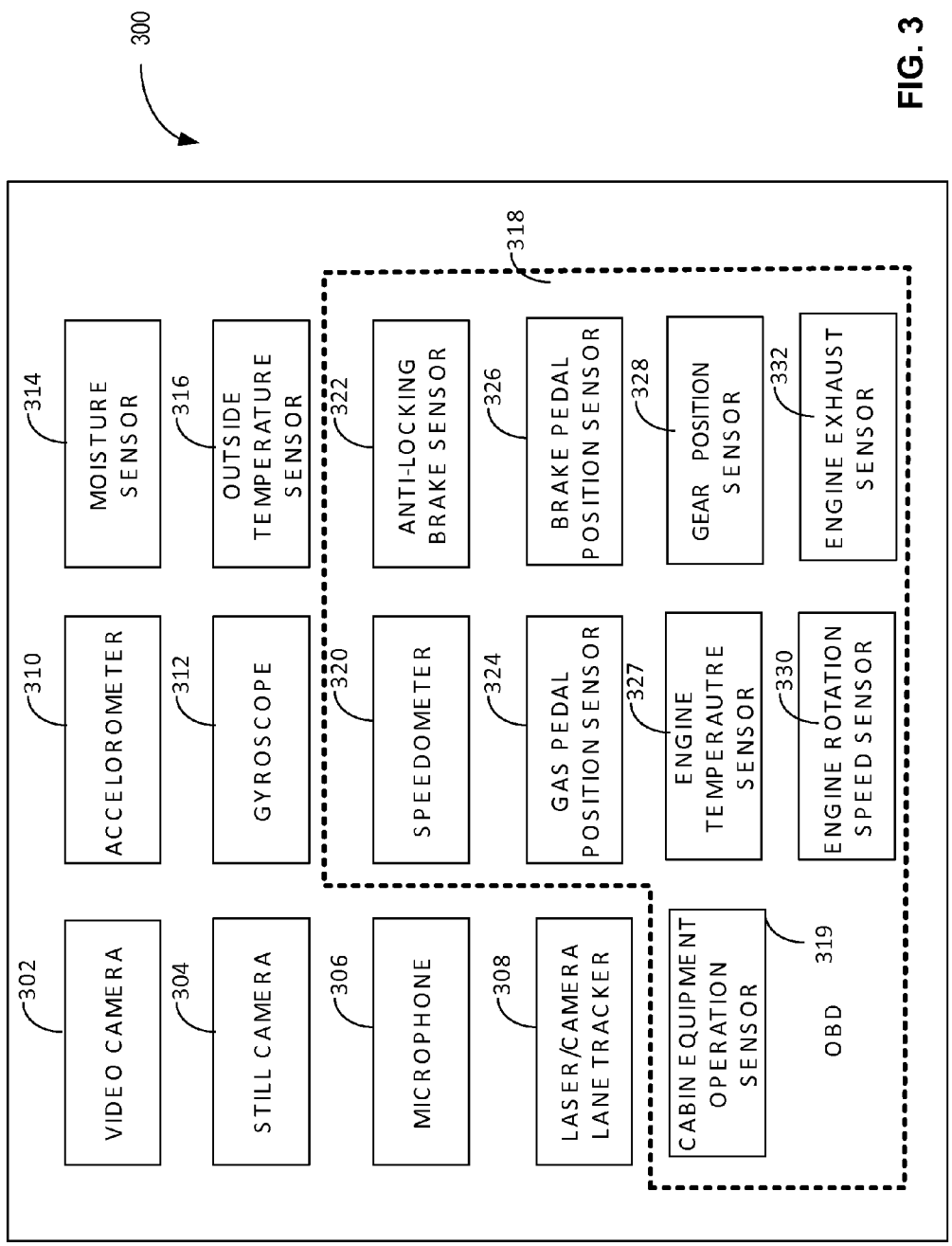
FIG. 3 is a block diagram illustrating an embodiment of onboard sensors.

FIG. 3 is a block diagram illustrating an embodiment of onboard sensors. In the example shown, one or more video cameras 302 and/or still cameras 304 are mounted at various positions on the vehicle to capture a cabin view or an exterior view—for example, a front view, a rear view, a left side view, and/or right side view. In some embodiments, video cameras 302 and/or still cameras 304 are equipped with infrared emitters for improved night vision and/or for imaging driver facial features through dark sun glasses. In some embodiments, video cameras 302 and/or the still cameras 304 comprise stereo video cameras and/or still cameras that are capable of capturing 3-D images. In some embodiments, the captured images are used to identify the driver and record both driver behavior and circumstances leading up to, during, and immediately after a driving event. The captured images may also be used to recognize road signs such as posted speed limit signs. In some embodiments, one or more microphones 306 are placed inside and/or outside the cabin to record audio sounds. In some embodiments, one or more laser and/or camera based lane tracking sensors 308 are positioned in the front and/or at the back of the vehicle to track drifting of the vehicle in lane. In some embodiments, video camera(s) 302 are mounted in the overhead console above the mirror to track the lane markings on the roadway. The captured video images may be processed using one or more processors to determine whether the vehicle has departed from its proper lane and by how much. In some embodiments, one or more accelerometers 310 are placed onboard the vehicle to monitor acceleration along one or more vehicle axes. The axes of vehicle acceleration may include a longitudinal vehicle axis (i.e., the axis substantially in the direction of the vehicle's principal motion), a traverse (lateral) vehicle axis (i.e., the substantially horizontal axis substantially orthogonal to the vehicle's principle motion), and a vertical vehicle axis (i.e., the axis orthogonal to both the longitudinal vehicle axis and the traverse vehicle axis). In various embodiments, accelerometers 310 comprise built-in accelerometers put in place by the vehicle manufacture or are add-on accelerometers added on post manufacture. In some embodiments, gyroscope 312 is placed on board the vehicle to detect angular rate of vehicle rotation and how quickly the vehicle turns. The rotation is typically measured in reference to one of three axes: yaw, pitch and roll. In some embodiments, moisture sensor 314 is mounted on the outside of the vehicle to detect environmental moisture level, which provides an indication whether it is raining on the road. In some embodiments, temperature sensor 316 is mounted on the outside of the vehicle to detect environmental temperature, which provides information as to how cold the outside environment is and whether it is below freezing and by how much. In addition, the onboard computer has the capability to access information detected by one or more vehicle sensors built in the vehicle by the manufacture via a vehicle bus interface such as an OBD interface 318. For example, via OBD interface 318, the onboard computer can access cabin equipment operation sensor 319, manufacturer built-in speedometer 320 for detecting vehicle speed, anti-lock brake system speed sensor 322 for detecting the rate at which the vehicle wheels are moving and whether the anti-locking brake has been engaged, gas pedal position sensor 324 and brake pedal position sensor 326 for detecting the gas pedal and brake pedal depression degrees and profiles, engine temperature sensor 327 for sensing engine temperature, gear position sensor 328 for sensing gear position/selection, engine rotation speed sensor 330 for sensing the engine rotation speed, and engine exhaust sensor 332 for sensing composition and temperature of engine exhaust. The onboard vehicle sensors are not limited by the examples provided here. In various embodiments, other vehicle sensors are included— for example, shock sensor, various cabin equipment operation sensors regarding operation of windshield wipers, state of lights (e.g., headlights on/off, fog lights on/off, turn signal lights left/right/off, etc.), operation of equipment within the vehicle such as radios, cellular phones, DVD players, the identity of the driver based on the entry of an identification number, seat settings, weight, status of seat belts, number of passengers, or any other appropriate sensors.

Figure 4:
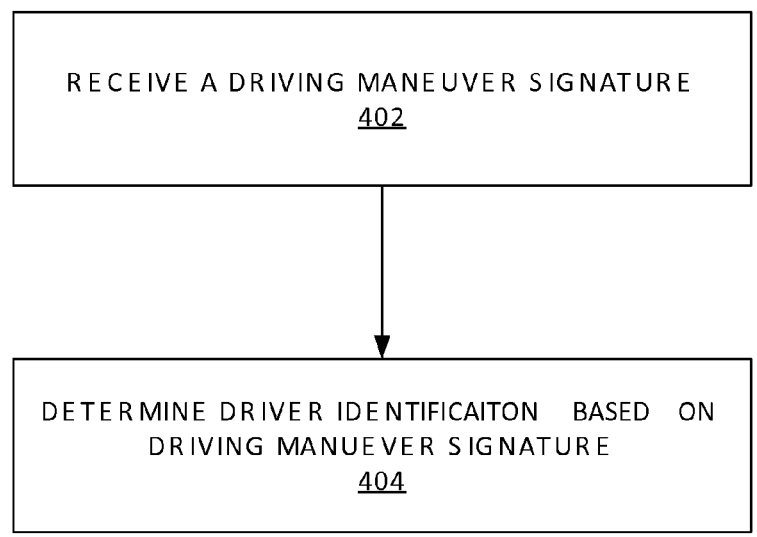
FIG. 4 is a flow diagram illustrating an embodiment of a process for identifying a driver.

FIG. 4 is a flow diagram illustrating an embodiment of a process for identifying a driver. In the example shown, in 402 a driving maneuver signature is received. In 404, a driver identification is determined based at least in part on the driving maneuver signature. For example, accelerometer waveform data and GPS data are collected during the execution of a right turn at an intersection controlled by a 4-way arrangement of stop signs. These data characterize the manner in which the driver slows to a stop at the intersection, and then proceeds to execute a 90 degree right turn from a dead stop (or, alternatively, how the driver performs an illegal, rolling stop). Applying a combination of filters, these data are represented as a multi-dimensional waveform spanning a time interval from several seconds before the vehicle arrives at the intersection until several seconds after the vehicle accelerates away from the intersection. In some embodiments, an n-dimensional feature vector is extracted from the multi-dimensional waveform. In various embodiments, some components of this feature vector comprise the output of a windowed Fourier transform, the maximum braking level during an approach to the full stop, the maximum cornering level during the right turn maneuver, and/or the maximum acceleration level as the vehicle leaves the intersection as well as the time intervals during which each vehicle acceleration component is in a particular range, or any other appropriate components of a feature vector. In some embodiments, the feature vector is compared to previously recorded feature vectors that are associated with known drivers and which were recorded at similar intersections, whose similarity is established using geo-location and/or map data such as from a digital safety map (e.g., a digital map that notes the locations of street signs and traffic signals). In some embodiments, a statistical pattern classifier is trained using feature vectors associated with known drivers where the association is determined by external data such as a driver dispatch log. In some embodiments, the trained classifier then estimates the probability that the feature vector was produced by one of those known drivers. In some embodiments, the trained classifier ranks the known drivers to indicate which are most likely to have performed the driving maneuver. In various embodiments, the statistical pattern classifier comprises an artificial neural network, a support vector machine, or any other appropriate classifier. In some embodiments, a generative model is constructed for each known driver, and these models are used to determine which of the known drivers were likely to have produced the new feature vector. In some embodiments, a model is produced for each known driver using labeled data, i.e., feature vectors that were collected when a particular driver was known to be driving the vehicle. In some embodiments, the accuracy of driver identification is improved by capturing a plurality of feature vectors associated with various driving maneuver signatures collected during continuous vehicle operation (which are therefore assumed to be produced by the same driver).

In some embodiments, a driving maneuver common to a plurality of trips is identified. For example, if all drivers of a fleet must make a right turn at an intersection when exiting the fleet yard, then that right turn is a common driving maneuver that can be used to compare maneuver execution by the drivers of the fleet. In various embodiments, driving maneuvers comprise right/left turn maneuvers, highway on/off ramp maneuvers, U-turn maneuvers, lane change maneuvers, vehicle launching from stop maneuvers, vehicle braking maneuvers, or are comprised of two or more simple maneuvers (e.g., braking prior to right cornering followed by acceleration is classified as a composition of three simple maneuvers: braking, cornering, and acceleration), or any other appropriate simple or combination driving maneuver.

In some embodiments, a driving maneuver signature is identified. In various embodiments, this involves identifying and capturing data, from one or more sensors, of a driving maneuver performed by a driver. In various embodiments, a driving maneuver signature comprises a set of sensor data, where sensor data in the set include steering wheel angle, gas pedal position, and brake pedal position, vehicle movement data (e.g., absolute velocity, longitudinal velocity, and lateral velocity, yaw rate (angular velocity), pitch rate and roll rate), vertical, longitudinal, and lateral g-force data experienced by the vehicle, or any other appropriate sensor data. In some embodiments, a similarity metric is used to measure the similarity between a new driving maneuver signature and a previously stored driving maneuver signature. In some embodiments, the similarity metric represents a distance between two driving maneuver signatures. For example, if the driving maneuver signature comprises data from one or more sensors with continuously varying sensor values, then a metric such as dynamic time warping distance may be used. As another example, if the sensor values are not continuously varying, but are discrete, then a metric based on Levenshtein distance may be used. If the distance between signatures is sufficiently low, the driver of the new driving maneuver signature is identified as the known associated driver of the previously stored driving maneuver signature.

In some embodiments, driving data are segmented into maneuvers by identifying defined periods of time during which sensor data are active. In various embodiments, periods are defined as the time intervals between periods of vehicle inactivity, with the time intervals correlated with changes in sensor data from more than one sensor, or the time intervals determined by any other appropriate method.

Figure 5:
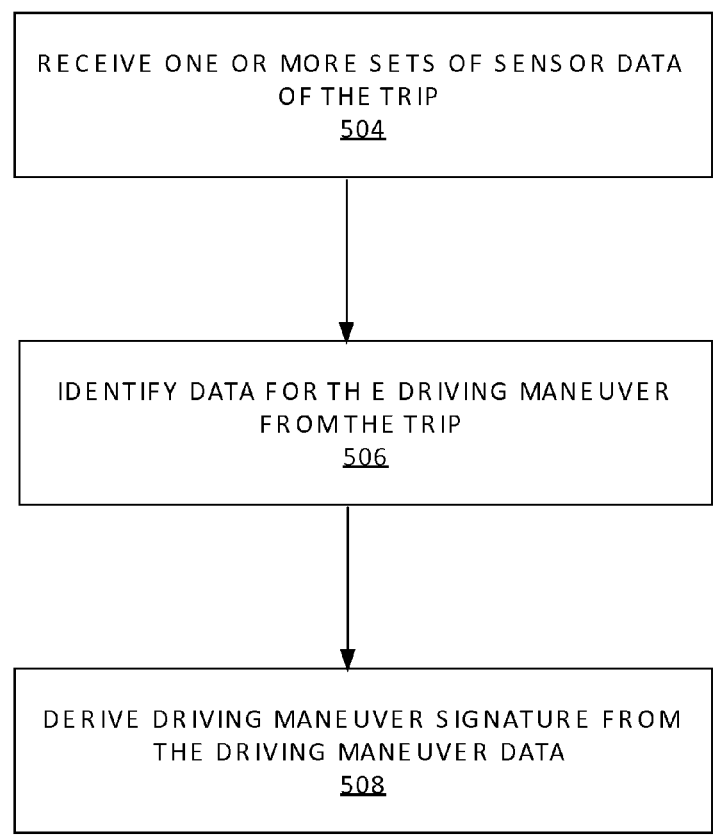
FIG. 5 is a flow diagram illustrating an embodiment of a process for identifying a driving maneuver signature.

FIG. 5 is a flow diagram illustrating an embodiment of a process for identifying a driving maneuver signature. In the example shown, in 504, driving data of the trip are captured. One or more vehicle sensors can be used to capture the driving data. In various embodiments, the vehicle sensors are onboard vehicle sensors. In various embodiments, the vehicle sensor data include state information about vehicle controls. Examples of such sensor data include steering wheel angle, gas pedal position, and brake pedal position. In various embodiments, the vehicle sensor data include vehicle movement characteristics. Examples of such sensor data include absolute velocity, longitudinal velocity, and lateral velocity, yaw rate (angular velocity), pitch rate and roll rate. In various embodiments, the vehicle sensor data include measurements of the forces experienced by the vehicle. Examples of such sensor data include vertical, longitudinal, and lateral acceleration experienced by the vehicle.

In 506, the driving maneuver data are identified from the driving data. In various embodiments, GPS location data is used to identify the time interval of the driving maneuver within the driving data. For example, if the GPS location data indicate that the vehicle is going in a particular direction and is passing through an intersection where the driver must perform a right cornering driving maneuver, driving data captured around that time are processed to determine the driving maneuver signature.

In various embodiments, there is a time lag to GPS location data, and one or more onboard sensor data are used to confirm/refine the GPS location data. Because the GPS has poor time response and the GPS determined geo-locations are not exact, using onboard sensor data, which are more temporally accurate and precise, to confirm/refine the GPS-determined geo-location can result in a more accurate continuous estimation of the moving vehicle traveling path. In various embodiments, visual images of the geo-location are used to confirm whether the GPS based geo-location is accurate. For example, the GPS determined geographic coordinates show that the location corresponds to a stop sign zone on a digital safety map. This is confirmed/refined using images captured using an image capturing device. An image processing algorithm that recognizes the stop sign is used to process video images captured using an onboard forward viewing video camera to confirm whether the moving vehicle is indeed in the stop sign zone and whether the stop sign is for the street on which the moving vehicle is traveling rather than for a side street. In various embodiments, various other onboard vehicle sensor data such as vehicle speed, direction, road gradient, number of lanes, vehicle trajectory, presence of traffic signal, presence of intersection, and detected road name are used to confirm/refine the GPS geo-location. If the GPS geo-location corresponds to a road feature or characteristic that is consistent with the onboard vehicle sensor data, then the GPS geo-location is confirmed. If the GPS geo-location is not consistent with the vehicle sensor data, the GPS geo-location can be refined or adjusted to be consistent with the vehicle sensor data. In some embodiments, GPS is used to continuously track geo-location of a moving vehicle.

In 508, the driving maneuver signature is derived from the driving maneuver data. Various vehicle sensors can be used to capture data for identifying the driver's driving maneuver signature. In various embodiments, the vehicle sensor data captured as the driver's signature include driver vehicle control information such as steering wheel angle, gas pedal position and brake pedal position. In various embodiments, the vehicle sensor data captured as the driver's signature include vehicle movement information such as vehicle absolute velocity, longitudinal velocity, lateral velocity, yaw rate (angular velocity), pitch rate and roll rate. In various embodiments, the vehicle sensor data captured as the driver's signature include information regarding forces experienced by the vehicle during the driving maneuver such as vertical, longitudinal and lateral g-forces experienced by the vehicle during the driving maneuver.

In various embodiments, various mathematical operations and classification schemes are used to identify features and characteristics of the driving maneuver and the identified features and characteristics are used as the driving maneuver signature of the driver. In various embodiments, mathematical operations include, for example, differentiation, integration, and correlation of sensor data, finding the maxima and minima of sensor data, or any other appropriate numerical transformations. In various embodiments, a classification scheme includes classifying a driving maneuver into individual maneuver primitives. For example, a stop and turn driving maneuver includes maneuver primitives such as a step on a brake, a subsequent vehicle stop, a turn of the steering wheel clockwise, a turn of the vehicle, a longitudinal acceleration, and a lateral acceleration, etc. In various embodiments, the various maneuver primitives are correlated. For example, longitudinal acceleration is correlated with lateral acceleration to determine or classify that the driver is in fact accelerating longitudinally at the same time of accelerating laterally.

Figure 6A:
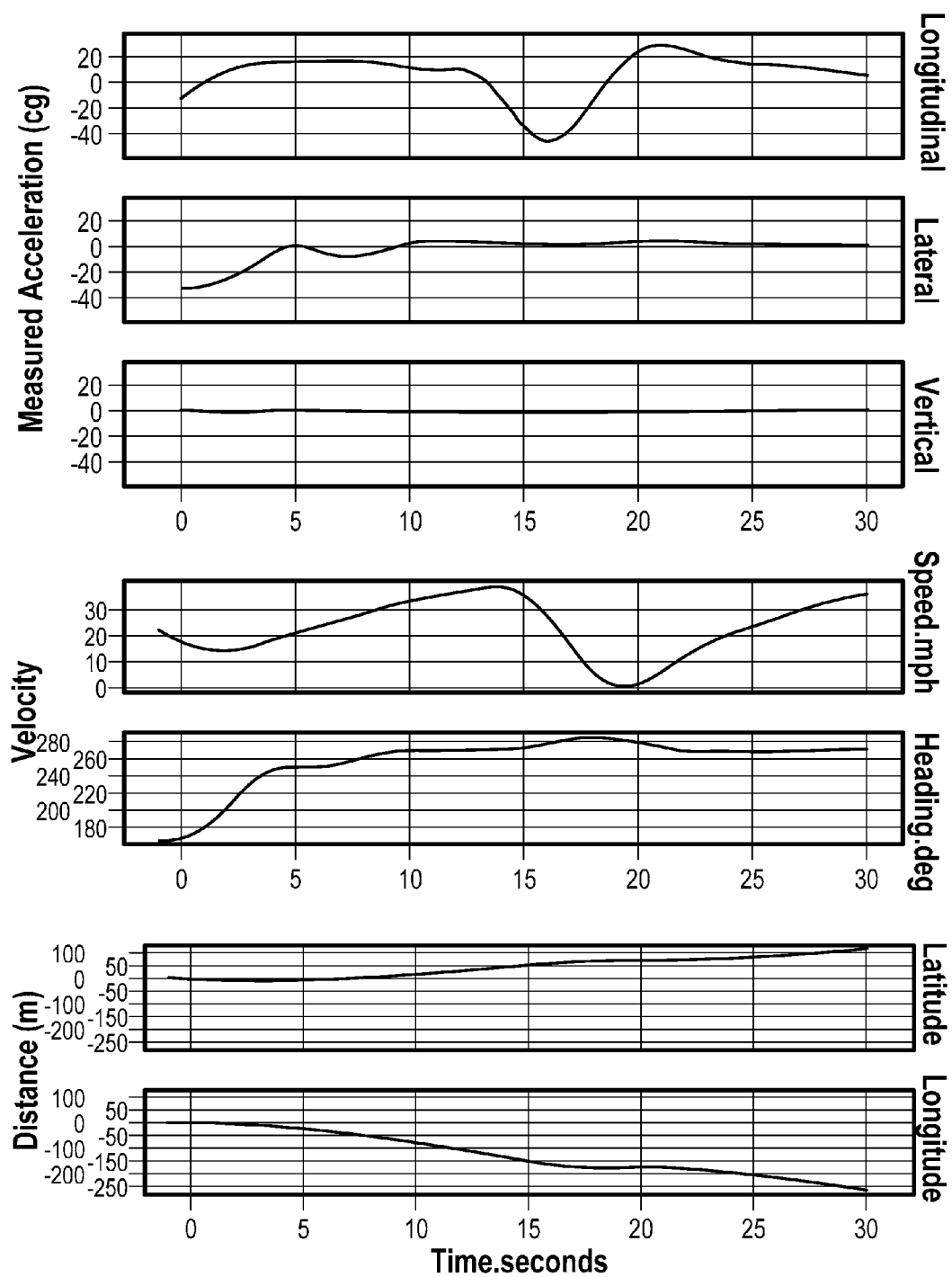
FIG. 6A is a graph illustrating an embodiment of a set of sensor data comprising a driving maneuver signature.

FIG. 6A is a graph illustrating an embodiment of a set of sensor data comprising a driving maneuver signature. In the example shown, sensor data are shown for a driving maneuver signature of a braking maneuver. The sensor data include accelerometer data for longitudinal acceleration, lateral acceleration, and vertical acceleration. The sensor data include velocity data comprising speed data and heading data. The sensor data include distance data comprising latitude data and longitude data. The sensor data have different values as a function of time (e.g., x-axis having labels 0 to 30 seconds). For example, the longitudinal acceleration shows positive acceleration from 0 to about 12 seconds, a negative peak from about 12 to 18 seconds, and then a positive value again from 18 seconds to 30 seconds. The lateral acceleration shows negative values for the first 5 seconds and then is flat or close to 0 for times 5 seconds through to 30 seconds. The vertical acceleration shows values close to 0 for times 0 through 30 seconds. The velocity data shows positive and essentially increasing speed from 0 to 15 seconds dropping almost to 0 speed at 20 seconds and then increasing again from 20 through 30 seconds. The heading data shows heading swinging from around 160 degrees to 250 degrees from zero seconds to 4 seconds and then roughly flat from 4 seconds to 30 seconds where the heading stays around 260 degrees. The distance data shows latitude changing approximately linearly from 0 meters to 100 meters at times 0 and 30 seconds respectively. The distance data shows longitude changing approximately linearly from 0 meters to −250 meters at times 0 and 30 seconds respectively.

In some embodiments, the driving maneuver signature includes raw and derived sensor data obtained from various onboard vehicle sensors. In various embodiments, the sensor data comprise (1) longitudinal velocity time profile, (2) lateral velocity time profile, (3) angular velocity profile, (4) steering wheel angle time profile, (5) gas pedal position time profile, (6) brake pedal position time profile, (7) GPS location tracking of the vehicle, or any other appropriate sensor data.

Figure 6B:
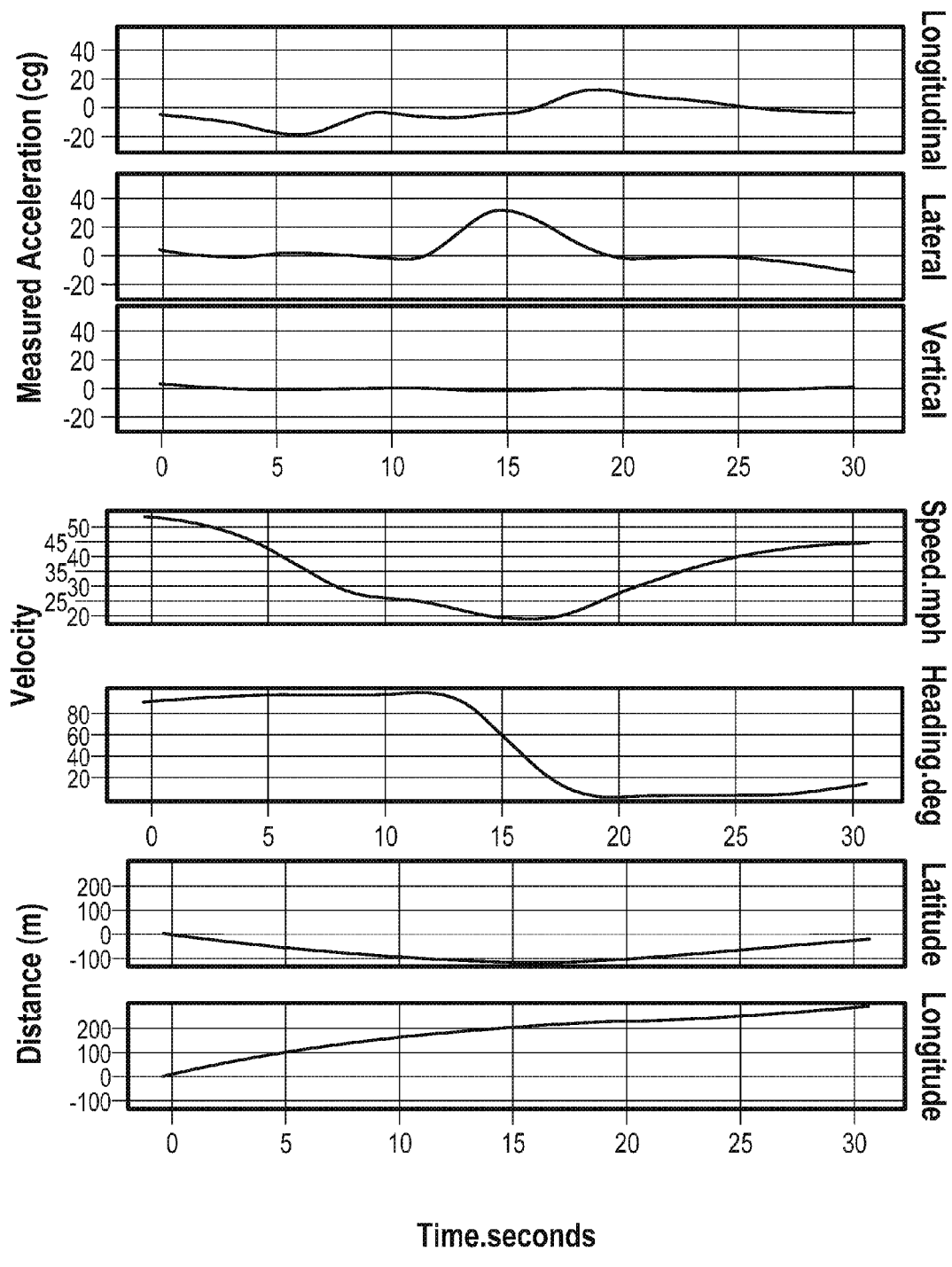
FIG. 6B is a graph illustrating an embodiment of a set of sensor data comprising a driving maneuver signature.

FIG. 6B is a graph illustrating an embodiment of a set of sensor data comprising a driving maneuver signature. In the example shown, sensor data are shown for a driving maneuver signature of a left turn maneuver. The sensor data include accelerometer data for longitudinal acceleration, lateral acceleration, and vertical acceleration. The sensor data include velocity data comprising speed data and heading data. The sensor data include distance data comprising latitude data and longitude data. The sensor data have different values as a function of time (e.g., x-axis having labels 0 to 30 seconds). For example, the longitudinal acceleration shows negative acceleration from 0 to about 15 seconds and a positive acceleration again from 15 seconds to 30 seconds. The lateral acceleration shows values of about 0 from 0 to 12 seconds and a peak of positive values from 12 to 18 seconds and again about 0 for 18 through 30 seconds. The vertical acceleration shows values close to 0 for times 0 through 30 seconds. The velocity data shows a slowing from over 50 mph to just less than 20 mph from 0 to 16 seconds and then speeding up from 16 to 30 seconds. The heading data shows heading about constant at about 90 degrees from 0 to 13 seconds and changing from 90 degrees to about 0 degrees from 13 seconds to 18 seconds and then constant at about 0 degrees from 18 to 30 seconds. The distance data shows latitude changing from 0 meters to −100 meters back to 0 for 0 seconds, 15 seconds and 30 seconds respectively. The distance data shows longitude changing about linearly from 0 meters to 250 meters at times 0 and 30 seconds respectively.

Figure 6C:
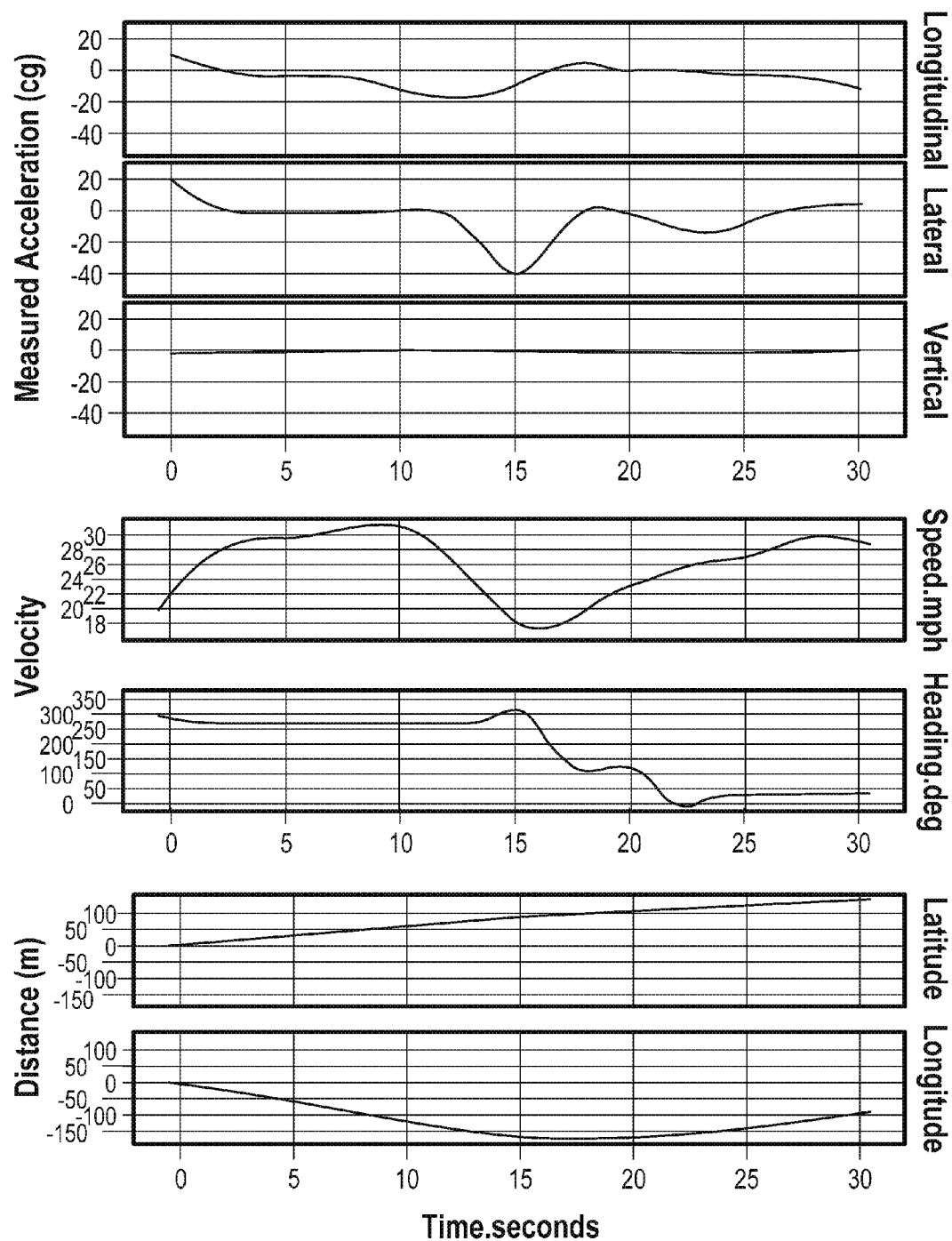
FIG. 6C is a graph illustrating an embodiment of a set of sensor data comprising a driving maneuver signature.

FIG. 6C is a graph illustrating an embodiment of a set of sensor data comprising a driving maneuver signature. In the example shown, sensor data are shown for a driving maneuver signature of a right turn maneuver. The sensor data include accelerometer data for longitudinal acceleration, lateral acceleration, and vertical acceleration. The sensor data include velocity data comprising speed data and heading data. The sensor data include distance data comprising latitude data and longitude data. The sensor data have different values as a function of time (e.g., x-axis having labels 0 to 30 seconds). For example, the longitudinal acceleration shows about 0 value from 0 to 30 seconds except for a negative bump from 10 to 15 seconds and a positive bump from 15 to 20 seconds. The lateral acceleration shows about 0 value from 0 to 30 seconds except for a negative bump from about 12 seconds to about 18 seconds. The vertical acceleration shows values close to 0 for times 0 through 30 seconds. The velocity data shows a rising from 0 to 3 seconds from 20 to 30 mph and steady to about 10 seconds when the speed drops to 18 mph at time 16 seconds and then rises from 16 to 30 seconds back up to about 30 mph. The heading data shows heading about constant at about 300 degrees from 0 to 15 seconds and changing to about 0 degrees from 15 seconds to 22 seconds and then constant at about 0 degrees from 22 to 30 seconds. The distance data shows latitude changing from 0 meters to 100 meters for 0 seconds to 30 seconds respectively. The distance data shows longitude changing about linearly from 0 meters to −150 meters at times 0 to 18 seconds and from −150 to −100 meters from 18 seconds to 30 seconds respectively.

Figure 6D:
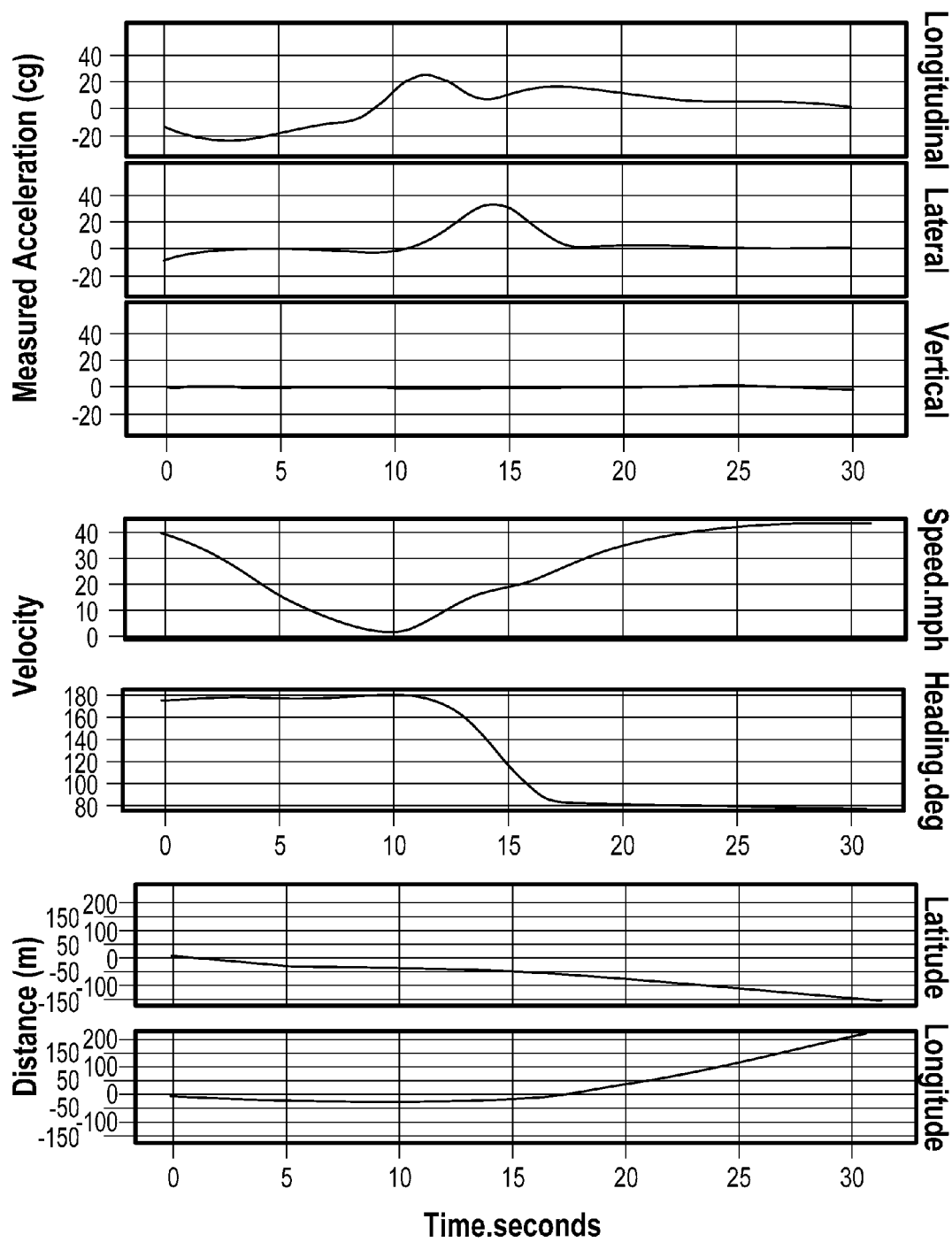
FIG. 6D is a graph illustrating an embodiment of a set of sensor data comprising a driving maneuver signature.

FIG. 6D is a graph illustrating an embodiment of a set of sensor data comprising a driving maneuver signature. In the example shown, sensor data are shown for a driving maneuver signature of a left turn maneuver. The sensor data include accelerometer data for longitudinal acceleration, lateral acceleration, and vertical acceleration. The sensor data include velocity data comprising speed data and heading data. The sensor data include distance data comprising latitude data and longitude data. The sensor data have different values as a function of time (e.g., x-axis having labels 0 to 30 seconds). For example, the longitudinal acceleration shows negative value from 0 to 8 seconds and a positive bump from 8 to 30 seconds. The lateral acceleration shows about a value 0 from 0 to 30 seconds except for a positive bump from about 12 seconds to about 17 seconds. The vertical acceleration shows values close to 0 for times 0 through 30 seconds. The velocity data shows a drop from 40 mph to 0 mph from 0 to 10 seconds and from 0 to 40 mph from 10 seconds to 30 seconds. The heading data shows heading about constant at about 180 degrees from 0 to 12 seconds and changing to about 90 degrees from 12 seconds to 17 seconds and then constant at about 90 degrees from 17 to 30 seconds. The distance data shows latitude changing from 0 meters to −150 meters for 0 seconds to 30 seconds respectively. The distance data shows longitude constant at 0 meters from 0 seconds to 16 seconds and then changing linearly from 0 meters to 200 meters at times 16 to 30 seconds.

Figure 6E:
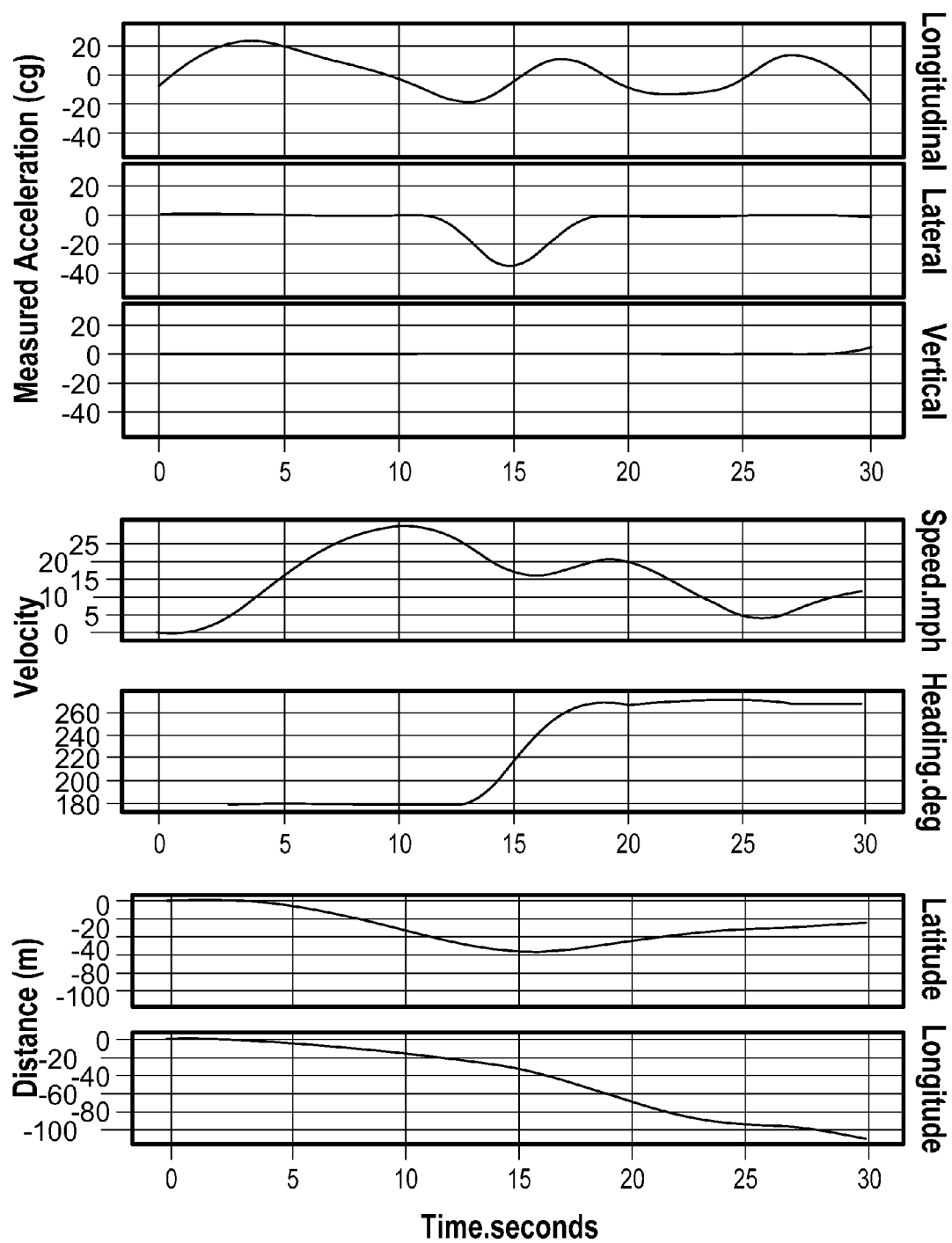
FIG. 6E is a graph illustrating an embodiment of a set of sensor data comprising a driving maneuver signature.

FIG. 6E is a graph illustrating an embodiment of a set of sensor data comprising a driving maneuver signature. In the example shown, sensor data are shown for a driving maneuver signature of a right turn maneuver. The sensor data include accelerometer data for longitudinal acceleration, lateral acceleration, and vertical acceleration. The sensor data include velocity data comprising speed data and heading data. The sensor data include distance data comprising latitude data and longitude data. The sensor data have different values as a function of time (e.g., x-axis having labels 0 to 30 seconds). For example, the longitudinal acceleration shows positive value from 0 seconds to 10 seconds, negative value from 10 to 15 seconds, positive value from 15 to 18 seconds, negative from 18 to 25 and positive from 25 to 28, and negative from 28 to 30 seconds. The lateral acceleration shows about a value of 0 from 0 to 30 seconds except for a negative bump from about 12 seconds to about 17 seconds. The vertical acceleration shows values close to 0 for times 0 through 30 seconds. The velocity data shows a rise from 0 mph to 30 mph from 0 to 10 seconds, and from 30 to 15 mph from 10 seconds to 16 seconds, and from 15 mph to 20 mph from 16 seconds to 19 seconds, and from 20 mph to 5 mph from 19 seconds to 25 seconds, and from 5 mph to 10 mph from 25 seconds to 30 seconds. The heading data shows heading about constant at about 180 degrees from 0 to 13 seconds and changing to about 260 degrees from 13 seconds to 17 seconds and then constant again at about 260 degrees from 17 to 30 seconds. The distance data shows latitude changing from 0 meters to −60 meters for 0 seconds to 15 seconds, and then from −60 meters to −20 meters from 15 seconds to 30 seconds. The distance data shows longitude changing approximately linearly from 0 meters to −110 meters from 0 seconds to 30 seconds.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for driver identification, comprising:
a processor configured to:
receive driving data captured during vehicle operation comprising a GPS location data and vehicle sensor data;
identify driving maneuver data at a specific location from the driving data, wherein the specific location is common to a plurality of trips in a database of previously stored driving maneuver signatures associated with known drivers, wherein the GPS location data is used to identify a time interval of the driving maneuver data within the driving data;

determine a driving maneuver signature from the driving maneuver data, wherein the driving maneuver signature includes features and characteristics of vehicle sensor data associated with the specific location and the common driving maneuver; and determine a similarity of the driving maneuver signature between the plurality of previously stored driving maneuver signatures associated with known drivers at the specific location;

determine a driver identification based on the similarity between the driving maneuver signature to the plurality of previously stored driving maneuver signatures associated with known drivers at the specific location, wherein the driver identification of the driving maneuver signature is identified as the known associated driver of the previously stored driving maneuver signature with a highest similarity; and a memory coupled to the processor configured to provide the processor with instructions.

2. The system of claim 1, wherein the similarity is determined using a dynamic time warping distance between the driving maneuver signature and one or more of a plurality of previously stored driving maneuver signatures in the database.

3. The system of claim 1, wherein identifying driving maneuver data by using GPS location data is further confirmed by other vehicle sensor data comprising visual images of the specific location.

4. The system of claim 1, wherein the features and characteristics comprising the driving maneuver signature comprise one or more of the following: a maximum braking level during an approach to a full stop, a maximum cornering level during the right turn maneuver, or a maximum acceleration level, time interval during which acceleration is in a particular range.

5. The system of claim 1, wherein the vehicle sensor data comprises one or more of following: steering wheel angle, gas pedal position, brake pedal position, absolute velocity, average speed, lateral distance, longitudinal distance, longitudinal velocity, lateral velocity, longitudinal acceleration, lateral acceleration, vertical acceleration, yaw, pitch, or roll.

6. The system of claim 1, wherein the driving maneuver signature comprises one or more of the following driving maneuvers: a right/left turn maneuver, a highway on/off ramp maneuver, a U-turn maneuver, a lane change maneuver, a vehicle launching from stop maneuver, a vehicle braking maneuver, a curve-handling maneuver, and a car following maneuver.

7. The system of claim 1, wherein the vehicle sensor data further includes environmental temperature and the moisture level.

8. The system of claim 1, wherein the driving maneuver signature further includes data received from one or more external sources that includes at least one of the following: weather, traffic, and road map information.

9. The system as in claim 1, wherein a trained statistical pattern classifier is used to determine a similarity, wherein the trained statistical pattern classifier estimates the probability that the driving maneuver signature was produced by one of the known drivers.

10. The system as in claim 1, wherein the processor is further configured to build a model of the identified driver based on the determined driving maneuver signature at the specific location.

11. The system as in claim 1, wherein the driving maneuver at the specific location comprises a cornering maneuver that is performed by all drivers as their vehicles exit a fleet yard.

12. A method for driver identification, comprising:
receiving driving data captured during vehicle operation comprising a GPS location data and vehicle sensor data;

identifying driving maneuver data at a specific location from the driving data, wherein the specific location is common to a plurality of trips in a database of previously stored driving maneuver signatures associated with known drivers, wherein the GPS location data is used to identify a time interval of the driving maneuver data within the driving data;

determining a driving maneuver signature from the driving maneuver data, wherein the driving maneuver signature includes features and characteristics of vehicle sensor data associated with the specific location and the common driving maneuver;

determining a similarity of the driving maneuver signature between the plurality of previously stored driving maneuver signatures associated with known drivers at the specific location; and determining, using a processor, a driver identification based on the similarity between the driving maneuver signature to a plurality of previously stored driving maneuver signatures associated with known drivers at the specific location, wherein the driver identification of the driving maneuver signature is identified as the known associated driver of the previously stored driving maneuver signature with a highest similarity.

13. The method of claim 12, wherein the similarity is determined using a dynamic time warping distance between the driving maneuver signature and one or more of a plurality of previously stored driving maneuver signatures in the database.

14. The method of claim 12, wherein identifying driving maneuver data by using GPS location data is further confirmed by other vehicle sensor data comprising visual images of the specific location.

15. The method of claim 12, wherein the features and characteristics comprising the driving maneuver signature comprise one or more of the following: a maximum braking level during an approach to a full stop, a maximum cornering level during the right turn maneuver, or a maximum acceleration level, time interval during which acceleration is in a particular range.

16. The method of claim 12, wherein the vehicle sensor data comprises one or more of following: steering wheel angle, gas pedal position, brake pedal position, absolute velocity, average speed, lateral distance, longitudinal distance, longitudinal velocity, lateral velocity, longitudinal acceleration, lateral acceleration, vertical acceleration, yaw, pitch, or roll.

17. The method of claim 12, wherein the driving maneuver signature comprises one or more of the following driving maneuvers: a right/left turn maneuver, a highway on/off ramp maneuver, a U-turn maneuver, a lane change maneuver, a vehicle launching from stop maneuver, a vehicle braking maneuver, a curve-handling maneuver, and a car following maneuver.

18. The method of claim 12, wherein the vehicle sensor data further includes environmental temperature and the moisture level.

19. The method of claim 12, wherein the driving maneuver signature further includes data received from one or more external sources that includes at least one of the following: weather, traffic, and road map information.

20. A computer program product for driver identification, the computer program product being embodied in a non-transitory computer readable storage medium and comprising computer instructions for:
- receiving driving data captured during vehicle operation comprising a GPS location data and vehicle sensor data;
- identifying driving maneuver data at a specific location from the driving data, wherein the specific location is common to a plurality of trips in a database of previously stored driving maneuver signatures associated with known drivers, wherein the GPS location data to is used to identify a time interval of the driving maneuver data within the driving data;
- determining a driving maneuver signature from the driving maneuver data, wherein the driving maneuver signature features and characteristics of vehicle sensor data associated with the specific location and the common driving maneuver;
- determining a similarity of the driving maneuver signature between the plurality of previously stored driving maneuver signatures associated with known drivers at the specific location; and
- determining a driver identification based on the similarity between the driving maneuver signature to of the plurality of previously stored driving maneuver signatures associated with known drivers at the specific location, wherein the driver identification of the driving maneuver signature is identified as the known associated driver of the previously stored driving maneuver signature with a highest similarity.

21. The computer program product of claim 20, wherein the similarity is determined using a dynamic time warping distance between the driving maneuver signature and one or more of a plurality of previously stored driving maneuver signatures in the database.

22. The computer program product of claim 20, wherein identifying driving maneuver data by using GPS location data is further confirmed by other vehicle sensor data comprising visual images of the specific location.

23. The computer program product of claim 20, wherein the features and characteristics comprising the driving maneuver signature comprise one or more of the following: a maximum braking level during an approach to a full stop, a maximum cornering level during the right turn maneuver, or a maximum acceleration level, time interval during which acceleration is in a particular range.

24. The computer program product of claim 20, wherein the vehicle sensor data comprises one or more of following: steering wheel angle, gas pedal position, brake pedal position, absolute velocity, average speed, lateral distance, longitudinal distance, longitudinal velocity, lateral velocity, longitudinal acceleration, lateral acceleration, vertical acceleration, yaw, pitch, or roll.

25. The computer program product of claim 20, wherein the driving maneuver signature comprises one or more of the following driving maneuvers: a right/left turn maneuver, a highway on/off ramp maneuver, a U-turn maneuver, a lane change maneuver, a vehicle launching from stop maneuver, a vehicle braking maneuver, a curve-handling maneuver, and a car following maneuver.

26. The computer program product of claim 20, wherein the vehicle sensor data further includes environmental temperature and the moisture level.

27. The computer program product of claim 20, wherein the driving maneuver signature further includes data received from one or more external sources that includes at least one of the following: weather, traffic, and road map information.

* * * * *